United States Patent [19]
Gibbens, III

[11] Patent Number: 5,014,443
[45] Date of Patent: May 14, 1991

[54] RADIAL ARM SAW ALIGNMENT DEVICE

[76] Inventor: Richard T. Gibbens, III, 100 Palmetto St., Schriever, La.

[21] Appl. No.: 524,649

[22] Filed: May 16, 1990

[51] Int. Cl.$^5$ .......................... B27G 23/00; G01B 5/25
[52] U.S. Cl. .................................................. 33/640
[58] Field of Search ................ 33/613, 645, 632, 633, 33/634, 640, 641, 628, 642

[56] References Cited
U.S. PATENT DOCUMENTS
4,218,826 8/1980 Duke .
4,443,950 4/1984 Cockeram .

Primary Examiner—Harry N. Haroian
Attorney, Agent, or Firm—Phelps Dunbar

[57] ABSTRACT

The invention relates generally to rotating saw blade alignment devices, and more particularly to such devices which facilitate the proper alignment of radial arm saws by eliminating the need for a gauge or measuring instrument in the alignment procedure, through the use of perpendicular and parallel components which, when attached to the radial arm saw, require a perpendicualr relationship between the saw blade, the saw table, and the rip fence or fence slot.

3 Claims, 2 Drawing Sheets

RADIAL ARM SAW ALIGNMENT DEVICE

BACKGROUND OF THE INVENTION

One of the most popular power saws in use today is the radial arm saw. In the United States there are over 7 million radial arm saws, utilized by both professional carpenters and woodworkers, as well as by amatuer hobbyists.

Proper alignment of the radial arm saw is vital to the satisfactory use of the saw. Proper alignment includes insuring that the rip fence or fence slot is truly perpendicular to the blade travel when the saw is set in the crosscut mode, that the saw blade is perpendicular to the saw table, and that the fore and aft edges of the saw blade form a line parallel to the line of blade travel to avoid the condition known as heeling.

The maintenance of proper alignment is important for the safety of the operator, for the realization of a satisfactory work product, and for the life of the equipment. The operator may be injured if the material being cut is thrown by the saw blade toward the operator, a condition known as kickback. Kickback can be caused by improper alignment which results in the pinching of the saw blade by the material being cut. Further, the operator's hand may be drawn into the saw blade by a kickback. The saw blade is more likely to be pinched if the saw blade is heeling.

For the professional carpenter or woodworker, a precise setting of the saw blade is necessary to his or her livelihood. To the amatuer, proper alignment results in a better product and encourages a sustained interest in the use of the radial arm saw.

A properly aligned radial arm saw reduces the stresses placed upon the saw components, thus extending the life of the equipment. Proper alignment also reduces saw blade wear, lowering the expense of operating the radial arm saw.

The existing methods and devices used for the alignment of radial arm saws involve resort to measuring devices and guages which check the alignment of the saw blade but which do not actually align the saw blade. The resulting alignment procedures are ones of trial and error which are time consuming and not necessarily accurate. Furthermore, these methods are often adversely effected by the tooth set of the blade, and do not readily provide alignment throughout the blade travel.

Radial arm saws are easily knocked out of alignment necessitating frequent realignment. Even normal use of the radial arm saw can cause the saw to become misaligned. Transportation or shipping of the radial arm saw and the use of dull saw blades also can result in misalignment.

There is clearly a need for a radial arm saw alignment device which effects proper alignment of the saw blade without the need for measuring devices and gauges, and which can be efficiently used by both the professional and amatuer carpenter.

SUMMARY OF THE INVENTION

An object of the present invention is to provide a device which will effect the proper alignment of radial arm saw blades without the use of measuring devices and gauges.

Another object of the present invention is to provide a radial arm saw alignment device which can be utilized on all makes and models of radial arm saws.

A further object of the present invention is to provide a radial arm saw alignment device which can be easily used by both professional and amatuer carpenters.

Yet another object of the invention is to provide a device which will effect in one single procedure the proper alignment of the radial arm saw blade with respect to the saw table, and with respect to the rip fence or fence slot, and insure parallelism between the fore and aft edges of the saw blade and the line of saw blade travel.

A still further object of the present invention is to provide a radial arm saw alignment device which is simple in construction and economical in manufacture.

Still another object of the present invention is to provide a radial arm saw alignment device which does not require removal of the saw blade for proper alignment of the radial arm saw.

These and other objects, advantages, and novel features of the invention will become apparent to those skilled in the art to which this invention relates from the detailed description which follows, including references to the accompanying drawings.

BRIEF DESCRIPTION OF THE DRAWINGS

In the drawings like characters of reference indicate corresponding parts in the different figures.

DETAILED DESCRIPTION OF THE PREFERRED EMBODIMENT

Figure 1:
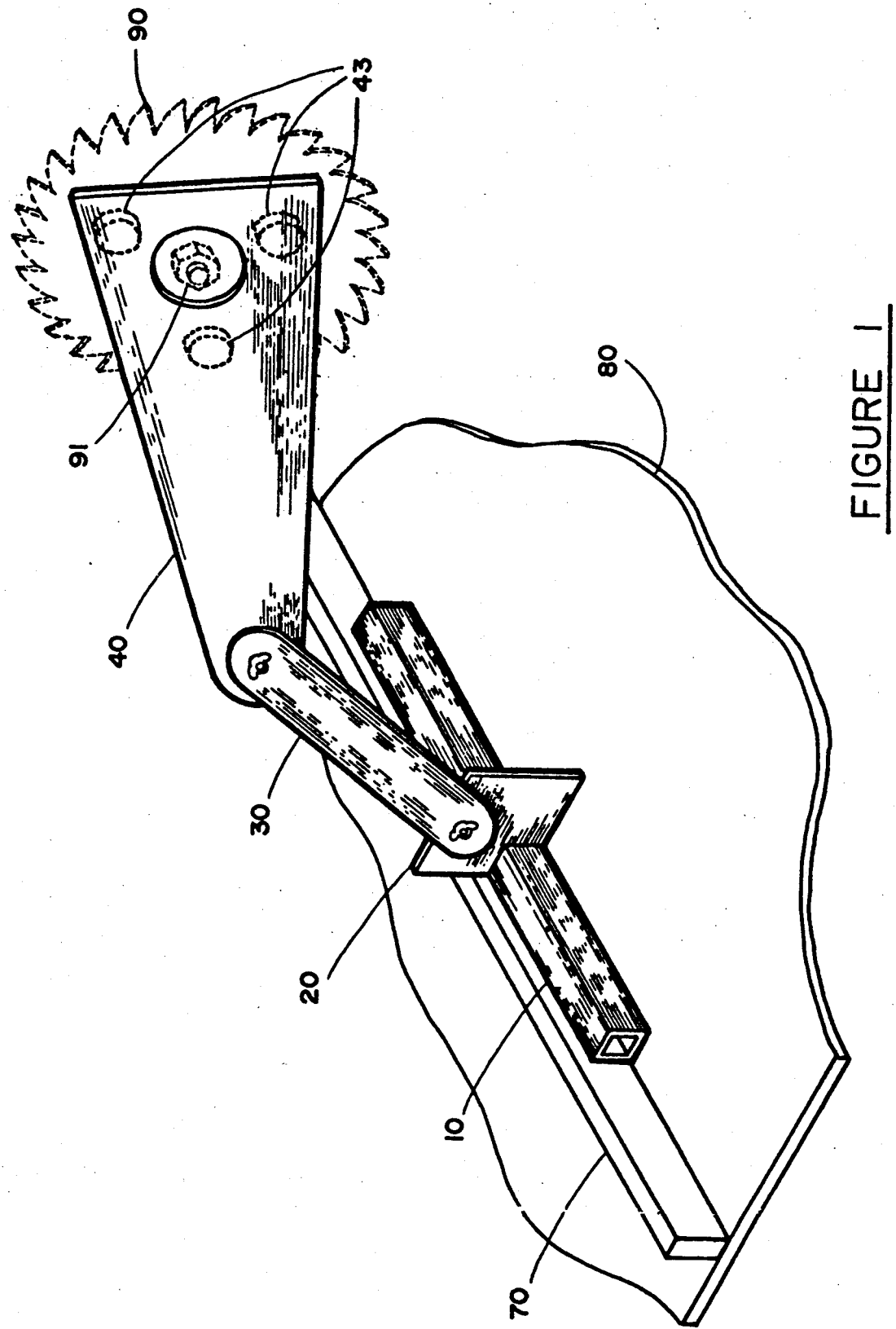
FIG. 1 is a perspective view showing how this alignment device would be utilized on a radial arm saw.

As can best be seen by reference to FIG. 1, this radial arm saw alignment device is comprised of two major components in the form of an elongated base member 10, and a system of plates perpendicular to the elongated base member 10 which couple the elongated base member 10 to the saw blade 90. This system of plates includes a lower plate 20, a connecting plate 30, an upper plate 40, and three attaching magnets 43.

Figure 5:
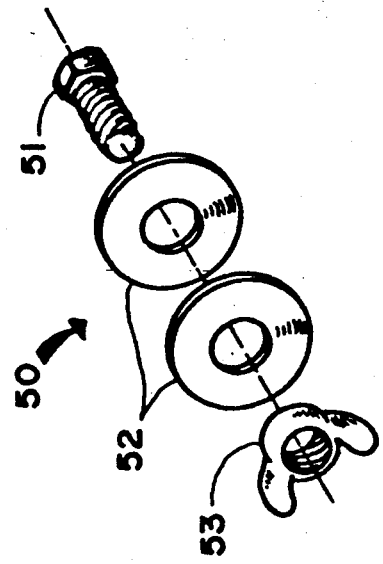
FIG. 5 is an exploded view of the securing means for pivotally joining the plates employed in this invention.

The lower plate 20 and connecting plate 30 are provided with securing means 50, for joining them together. The connecting plate 30 and upper plate 40 are provided with securing means 50, for joining them together. The securing means 50 as shown in FIG. 5, comprise a threaded bolt 51, a plurality of washers 52, and a wing nut 53; however, any securing means which allows pivoting of the connector plate 30 about the axis of the securing means to the lower plate 20 and the securing means to the upper plate 40 would suffice.

The elongated base member 10 and lower plate 20 are provided with securing mean 60 for joining them together such that the plane of the lower plate 20 is perpendicular to the longitudinal axis of the elongated base member 10. The securing means 60 as shown in FIG. 2 comprises a welded joint between the elongated base member 10 and the lower plate 20; however, any securing means which assures the maintenance of the perpendicular relationship between the longitudinal axis of the elongated base member 10 and the plane of the lower plate 20 would suffice.

In the preferred embodiment the elongated base member 10, and the system of plates; that is, the lower plate 20, the connecting plate 30, and the upper plate 40, are fabricated from heavy gauge metal. All of the external surfaces of these components are smooth and flat, and all of the edges form 90° angles.

Figure 2:
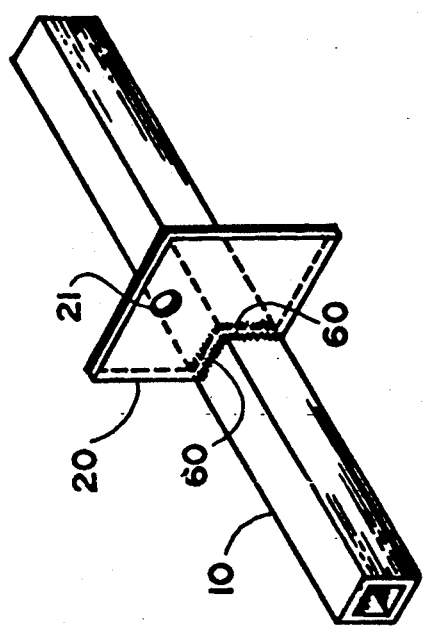
FIG. 2 is a perspective of the elongated base member and attached lower plate.

Referring to the assembly of the elongated base member 10 and the lower plate 20 shown in FIG. 2, it can be seen that the lower plate 20 is provided with an aperture 21 located in the upper half of the lower plate 20.

Figure 3:
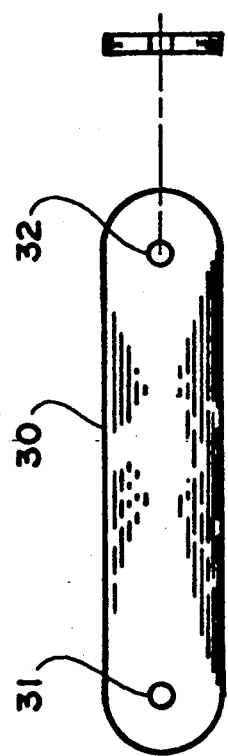
FIG. 3 is a combined front and side view of the connecting plate.

Referring to the connector plate 30 as shown in FIG. 3, it can be seen that the connector plate 30 is provided with an aperture 31 located near one end of the connector plate 30. The aperture 1 is of the same diameter as the aperture 21 on the lower plate 20. The connector plate 30 is further provided with an aperture 32, located near the end of the connector plate 30 opposite the end containing aperture 31

Figure 4:
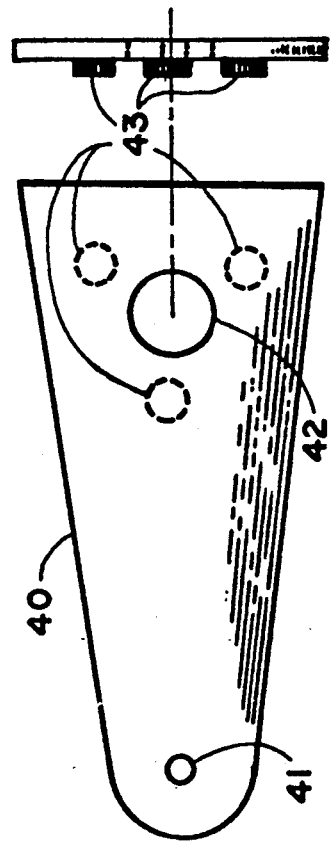
FIG. 4 is a combined front and side view of the upper plate which attaches to the saw blade.

Referring to the upper plate 40 as shown in FIG. 4, it can be seen that the upper plate 40 is provided with an aperture 41 located near the narrower end of the upper plate 40. The aperture 41 is of the same diameter as the aperture 32 on the connector plate 30. The upper plate 40 is further provided with an aperture 42 of significantly larger diameter than aperture 41, and located nearer the end of the upper plate 40 opposite the end containing aperture 41. The upper plate 40 is further provided with attaching means 43, for attaching the upper plate 40 to the radial arm saw blade 90. The attaching means 43 as shown in FIG. 4 comprise three magnets of equal dimensions spaced equally around aperture 42; however, any attaching means which maintains the radial arm saw blade 90 in a parallel plane to the upper plate 40 will suffice.

The threaded bolt 51, as shown in FIG. 5, is dimensioned to fit snugly into aperture 21 in the lower plate 20, apertures 31 and 32 in the connector plate 30 and aperture 41 in the upper plate 40, and to cooperate with the washers 52, and the wing nut 53, to join the lower plate 20 and upper plate 40 to the connector plate 30 in such a manner as to allow pivoting about the axis of the threaded bolt 51.

In operation, the elongated base member 10 is placed on the radial arm saw table surface 80, and abutting the radial arm saw rip fence 70 as shown in FIG. 1. The saw blade guard (not illustrated) is removed from the radial arm saw, and the saw blade 90 is raised approximately four inches above the surface of the table 80. The upper plate 40 is attached to the saw blade 90 by placing the saw blade arbor 91 through the large aperture 42 allowing the three magnets 43 to attach to the saw blade 90. The saw blade 90 is then moved in and out along the radial arm while the operator views the elongated base member 10 for any movement up or down, sideways along the rip fence 70, or in and out along the table surface 80. If movement is detected the radial arm saw is out of alignment. The appropriate adjustment stops are loosened, and the saw blade 90 is again moved in and out along the radial arm while insuring that the elongated base member 10 remains firmly against the rip fence 70 and table surface 80. It should be appreciated at this point that the perpendicular relationship between the elongated base member 1 and the lower plate 20 is transferred to the saw blade 90 throughout the path of blade travel, assuring that the saw blade 90 travels perpendicular to the rip fence 70, and is perpendicular to the table surface 80. The equal dimension and spacing of the attaching magnets 43 also requires that the fore and aft edges of the saw blade 90 travel in a plane perpendicular to the rip fence 70, eliminating misalignment known as heeling. The adjustment stops are then tightened, and the alignment device used again to recheck for proper alignment. The device is then removed and the saw blade guard replaced.

Having disclosed the subject matter of this invention, it should be obvious that many substitutions, variations, and modifications of this device are possible in light of the above teachings. It is therefore intended that all matter contained in the accompanying specification shall be interpreted as illustrative only, and not in a limiting sense. The invention as described should only be limited by the breadth and scope of the appended claims.

What I claim is:

1. A radial arm saw alignment device comprising;
   an elongated base member for engaging a fence slot or rip fence of a radial arm saw table, and
   means for pivotally coupling the motor/blade assembly of a radial arm saw to said elongated base member in a plane perpendicular to both the longitudinal axis of said elongated base member and the rotational axis of the motor/blade assembly of a radial arm saw, wherein said pivotally coupling means includes;
   a plurality of plates,
   securing means for pivotally joining said plates together in parallel planes,
   securing means for perpendicularly connecting one of said plates to said elongated base member, and
   securing means for attaching one of said plates to a radial arm saw blade, whereby said plate and the radial arm saw blade lie in parallel planes,
   whereby the proper alignment of a radial arm saw is achieved by the transfer of the perpendicular and parallel relationships of the alignment device to a radial arm saw throughout the traversal of the motor/blade assembly along the radial arm.

2. A radial arm saw alignment device as recited in claim 1, wherein said plates include,
   an upper plate provided with an enlarged aperture of sufficient dimension to allow passage of the arbor and blade securing mechanism of a radial arm saw, and further provided with a second smaller aperture located proximate the end of said upper plate opposite said enlarged aperture, dimensioned to receive said securing means for pivotally joining said plates together,
   a connecting plate provided with a plurality of apertures dimensioned the same as said upper plate smaller aperture and located proximate each end of said connecting plate, and
   a lower plate provided with an aperture dimensioned the same as said connecting plate apertures and located proximate an edge of said lower plate.

3. A radial arm saw alignment device as recited in claim 1 or 2 wherein said securing means for attaching one of said plates to the radial arm saw blade includes a plurality of magnets of equal thickness located as to provide for equal distribution upon a saw blade.

* * * * *